United States Patent
Fischer (10) Patent No.: US 9,045,181 B2
(45) Date of Patent: Jun. 2, 2015

(54) POSITION-SECURING MECHANISM AND DEVICE UNIT EQUIPPED THEREWITH

(71) Applicant: CLAAS SAULGAU GMBH, Saulgau (DE)

(72) Inventor: Josef Fischer, Biberach (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 0 days.

(21) Appl. No.: 14/278,192

(22) Filed: May 15, 2014

(65) Prior Publication Data

US 2014/0348608 A1    Nov. 27, 2014

(30) Foreign Application Priority Data

May 24, 2013    (DE) .......................... 10 2013 209 737

(51) Int. Cl.
| | | |
|---|---|---|
| B60P 7/08 | (2006.01) | |
| B62D 63/08 | (2006.01) | |
| A01B 73/00 | (2006.01) | |
| A01D 75/00 | (2006.01) | |
| A01F 12/00 | (2006.01) | |
| A01F 29/01 | (2006.01) | |

(52) U.S. Cl.
CPC ................ *B62D 63/08* (2013.01); *A01B 73/00* (2013.01); *A01D 75/002* (2013.01); *A01F 12/00* (2013.01); *A01F 29/01* (2013.01)

(58) Field of Classification Search
CPC ........ A01D 75/002; A01F 12/00; A01F 29/01
USPC ............... 410/2, 44, 77, 80; 280/789; 56/228, 56/473.5
See application file for complete search history.

(56) References Cited

U.S. PATENT DOCUMENTS

| 4,607,996 A | 8/1986 | Koch | |
|---|---|---|---|
| 6,419,431 B1 * | 7/2002 | Kuhns | ............................... 410/2 |

FOREIGN PATENT DOCUMENTS

| AT | 501589 | 10/2006 |
|---|---|---|
| DE | 101 21 039 | 10/2002 |
| EP | 0105055 | 4/1984 |
| EP | 0956753 | 11/1999 |
| FR | 2833901 | 6/2003 |

* cited by examiner

*Primary Examiner* — Stephen Gordon
(74) *Attorney, Agent, or Firm* — Michael J. Striker (57) ABSTRACT

A position-securing mechanism and a device unit equipped therewith for securing a working device to a trailer is designed to the working device is attachable to a working machine via a coupling device. The position-securing mechanism is formed with a sensor designed to detect a coupled state and a decoupled state of the coupling device, a receiving device having first and second functional sections provided on a first longitudinal side of the trailer or the working device, a locking device that is brought into a locked state in which this locking device prevents the release of the engagement of the functional sections and into an unlocked state in which this locking device permits the release of this engagement and a drive device connected to the sensor and driven thereby.

10 Claims, 5 Drawing Sheets

POSITION-SECURING MECHANISM AND DEVICE UNIT EQUIPPED THEREWITH

CROSS-REFERENCE TO A RELATED APPLICATION

The invention described and claimed hereinbelow is also described in German Priority Document DE 10 2013 209737.9, filed on May 24, 2013. The German Priority Document, the subject matter of which is incorporated herein by reference, provides the basis for a claim of priority of invention under 35 U.S.C. 119(a)-(d).

BACKGROUND OF THE INVENTION

The invention relates to a position-securing mechanism for securing the position of an agricultural working device, which can be attached to an agricultural working machine via a coupling device, on a trailer and, to a device unit of an agricultural working device and a trailer for the working device, where the device unit is equipped with two such position-securing mechanisms.

Self-propelled agricultural harvesting machines, such as forage harvesters and combine harvesters, are usually provided with working devices or front attachments such as headers, pick-ups, snapping units and corn headers in order to harvest crop such as corn, hay or grain from the field.

In order to be operated, such working devices are typically mounted on the working machine by a coupling device, such that these working devices extend transversely to the direction of travel. Working devices are known to have a working width or length of approximately 9 m. In order to move the working machine along with the working device on a public road, it is therefore necessary to reduce the overall width of the working machine to a legally permissible dimension.

To this end, known working devices can be either angled in segments or folded onto one another, while remaining at the front of the working machine or, while secured on a trailer, coupled to the rear of the working machine and drawn thereby such that the working devices are oriented along the direction of travel.

Since the current trend of continuously increasing the engine output of the working machines is accompanied by continuously increasing working widths of the working devices, for example, of up to 12 m, the issue of hauling the working devices on trailers is becoming more significant, since the front axle load of the working machines is limited on public roads. It is challenging, therefore, to ensure that the working device can be quickly and reliably removed from the trailer and placed onto and positionally secured on the trailer.

DE 101 21 039 A1 makes known a trailer for a front harvesting attachment, comprising a chassis, a surface designed to receive a front harvesting attachment and a detent element that can be moved between a first position, in which the front harvesting attachment is placed onto the trailer and removed therefrom and a second position, in which the detent element affixes the front harvesting attachment on the trailer. A feeler element is provided on the trailer, which interacts with the front harvesting attachment and is designed so that when the front harvesting attachment is placed onto the trailer, the detent element automatically moves out of the first position and into the second position. The movement of the detent element out of the second position back into the first position is initiated manually by an operator or driver of the working machine to be equipped with the front harvesting attachment. This requires additional set-up time and can reduce operational reliability, since the front harvesting attachment is then in a state in which this front harvesting attachment is unlocked from the trailer and is not yet coupled to the working machine.

SUMMARY OF THE INVENTION

The present invention overcomes the shortcomings of known arts, such as those mentioned above.

To that end, the present invention provides a position-securing mechanism for securing the position of an agricultural working device, which can be attached to an agricultural working machine via a coupling device, on a trailer, such position-securing mechanism ensuring that the working device can be quickly and reliably removed from the trailer and placed onto and positionally secured on the trailer.

The invention also provides a device unit of an agricultural working device and a trailer for the working device, wherein the device unit is equipped with two such position-securing mechanisms, thereby ensuring that the working device can be quickly and reliably removed from the trailer and placed onto and positionally secured on the trailer.

In an embodiment, the position-securing mechanism comprises a sensor (e.g., a contact probe), which is provided on the coupling device (for coupling the working device to the agricultural working machine), on the working-device side and which is designed to detect a coupled state and an uncoupled state of the coupling device. The position-securing mechanism also includes a receiving device having a first functional section, which is provided on a first of two longitudinal sides of the trailer, which face away from one another and extend along the longitudinal direction of this trailer, and a second functional section, which is provided on a first of two longitudinal sides of the working device, which face away from one another and extend along a longitudinal direction of this working device. The first and the second functional sections engage with one another to form a support bearing. Consequently, the first longitudinal side of the working device is supported on the first longitudinal side of the trailer and the second longitudinal side of the working device faces the same direction as the second longitudinal side of the trailer. The position-securing mechanism also includes a locking device disposed on the working device that can be selectively brought into a locked state by which the locking device prevents the release of the engagement of the two functional sections of the receiving device, and into an unlocked state by which the locking device permits the release of the engagement of the two functional sections of the receiving device. A drive device disposed on the working device is connected to the sensor, in order to be controlled thereby, and is connected to the locking device in order to drive this locking device. Consequently, the locking device is brought into the locked state when the sensor detects the decoupled state, and is brought into the unlocked state when the sensor detects the coupled state.

As the locked state and the unlocked state of the locking device are established in a manner directly dependent on the coupling state of the coupling device, it is ensured that the working device is always either coupled to the working machine or is accommodated on the trailer in a positionally secure manner. It is thereby ensured that the working device can be removed from the trailer and placed onto and positionally secured on the trailer with high operational reliability.

As establishing the locked state and the unlocked state of the locking device is automatically initiated by the sensor or the coupling state of the coupling device, the working device is more rapidly removed from the trailer and placed onto and positionally secured on the trailer than conventional working devices.

In an embodiment, the sensor comprises mechanical, electrical, electronic, magnetic and/or electromagnetic components, individually or in combination. Preferably, the first and second functional section of the receiving device each are designed as an integral unit of a plurality of components or as an arrangement of a plurality of separate components. The locking unit acts directly on the support bearing that is formed, or in another position. For that matter, the working device comprises mechanical, electrical, electronic, magnetic, hydraulic and/or electromagnetic components, individually or in some combination thereof.

The first functional section of the receiving device comprises a first support brace, which extends horizontally lengthwise and in the longitudinal direction of the trailer. The second functional section of the receiving device has a recess, which is open vertically downward and is configured such that, by reaching over and straddling the first support brace, this support brace is engaged in the recess to form the support bearing. Consequently, the first longitudinal side of the working device is supported against the first longitudinal side of the trailer.

In the case of a working machine such as a forage harvester, for example, the receiving or coupling of the working device on or to this working machine is typically implemented by moving a crop feeder of the working machine approximately vertically upward, wherein two coupling humps of the coupling device configured according to the invention are provided on the top of the crop feeder to engage in two corresponding coupling receptacles of the coupling device, which are provided on the working device.

Due to the aforementioned embodiment according to the invention having the first support brace and the recess, wherein the mutual engagement of the first and the second functional section or the formation of the support bearing is established by moving the working device vertically downward relative to the trailer, the vertically downward movement of the crop feeder, which is necessary in order to decouple the working device from the working machine, is used to engage the first and the second functional section or to form the support bearing since the vertical displacement of the crop feeder is synchronously accompanied by the working device attached thereto moving vertically downward relative to the trailer. In other words, a single vertically downwardly directed displacement motion, i.e., moving the crop feeder of the working machine vertically downward, is used to decouple the working device from the working machine and to couple the working device to the trailer. This increases the functional reliability and the speed of the set-up procedure.

Preferably, the first support brace is embodied as a round bar having a predetermined length, thereby enabling the working device, upon placement onto the trailer, to swivel about the longitudinal axis thereof or about the longitudinal axis of the trailer into a desired position on the trailer. This simplifies the setting-down and therefore increases the speed of the set-up procedure.

Preferably, the recess has an angled contour, the opening width of which is greater than one thickness dimension or one diameter of the first support brace, thereby enabling the first support brace, upon engagement thereof in the recess, to glide along the angled contour in the direction toward the vertex thereof, thereby simplifying the engagement and, therefore, speeding up the implementation thereof.

Alternatively, the recess has a contour that is complementary to the outer circumferential contour of the first support brace, thereby making it possible for the first support brace to be more reliably held in the recess. In the case of the angular contour, the contour that is complementary to the outer circumferential contour of the first support brace is preferably disposed in the angle vertex.

In an embodiment, the first functional section of the receiving device comprises a second support brace that extends horizontally lengthwise and in the longitudinal direction of the trailer, wherein the second functional section of the receiving device has an end section that is disposed such that the end section bears against an outer circumference of the second support brace when the support bearing is formed and, the second support brace and the end section are offset outwardly relative to the support bearing by a predetermined extent transversely to the longitudinal direction of the trailer and vertically downward by a predetermined extent.

The embodiment further includes a counter-bearing or stop relative to the support bearing. In the case of a high center of gravity of the working device placed onto the trailer, such as when segments of the working device have been folded onto one another in order to reduce the length, the counter-bearing prevents the working device from tipping over about the longitudinal axis of the trailer, thereby further increasing the operational reliability.

Since the first and the second support brace extend via a predetermined, preferably identical length horizontally and in the longitudinal direction of the trailer, the receiving pair of working device and trailer has a pairing tolerance in this direction that approximately corresponds to the predetermined length, which further simplifies the positionally secure placement of the working device on the trailer and therefore further increases the functional reliability and speed of the set-up procedure.

In an embodiment, the second functional section of the receiving device has a first sliding surface that faces vertically downward and extends horizontally lengthwise and transversely to the longitudinal direction of the working device and is offset outwardly relative to the support bearing by a predetermined extent transversely to the longitudinal direction of the working device.

When the working device is moved horizontally toward the trailer, the sliding surface advantageously permits pre-positioning of the working device relative to the trailer or the second functional section relative to the first functional section of the receiving device and therefore further increases the functional reliability and speed of the set-up procedure.

In an embodiment, the second functional section of the receiving device has a second sliding surface (which extends directly adjacent to an inner longitudinal end of the first sliding surface that extends transversely to the longitudinal direction of the working device), which provides a sliding connection between the first sliding surface and the support bearing and is offset vertically downward by a predetermined extent relative to the support bearing.

Due to the second sliding surface, when the working device is placed onto the trailer, the second functional section can be brought into an end position provided for engagement with the first functional section. Since the first sliding surface is offset vertically downward by a predetermined extent relative to the support bearing, the second sliding surface extends such that this second sliding surface follows the vertically downward movement of the working device relative to the trailer and provides guidance therefor. As a result, the functional reliability and the speed of the set-up procedure can be further increased.

When the recess has the angled contour, the second sliding surface is formed by a leg of the angled contour.

In an embodiment, the first functional section comprises a notched strip, which extends horizontally lengthwise and in the longitudinal direction of the trailer and has, on a vertically upper longitudinal edge thereof, a plurality of recesses, which are equidistantly spaced apart from one another in the longitudinal direction. The notched strip is disposed such that, upon mutual engagement of the first and the second functional section, the first sliding surface is engaged in one of the recesses and rests on a base section thereof.

This embodiment provides additional positional securing of the working device on the trailer in the direction of travel thereof or in the longitudinal direction, wherein the pairing tolerance in the longitudinal direction is maintained by the plurality of recesses provided for engagement. This increases the operational reliability while providing simple ease-of-use of the positional securing. The notched strip is preferably vertically displaceable and is spring-loaded vertically upward. This makes it easier to position the first sliding surface vertically in one of the recesses.

In an embodiment, the first functional section comprises a first and a second notched strip, each of which extends horizontally lengthwise and in the longitudinal direction of the trailer, and each of which having, on a vertically upper longitudinal edge thereof, a plurality of recesses having a predetermined longitudinal extension and that are equidistantly spaced apart. Recesses of the first notched strip are offset in the longitudinal direction, relative to the recesses of the second notched strip, by half of the longitudinal extension. The first and the second notched strip are each vertically displaceable and are spring-loaded vertically upward and are disposed such that, upon mutual engagement of the first and the second functional section, the sliding surface is engaged in one of the recesses of one of these two notched strips and rests on a base section of the particular recess.

This embodiment provides additional positional securing of the working device on the trailer in the direction of travel thereof or in the longitudinal direction, wherein the pairing tolerance in the longitudinal direction is maintained by the plurality of recesses provided for engagement. Given that two or more notched strips are provided, wherein these notched strips are offset with respect to one another in terms of the recesses thereof, the likelihood and security of detent engagement is increased, which further increases the operational reliability while providing simple ease-of-use of the positional securing. Given that the notched strips are vertically displaceable and are spring-loaded vertically upward, it becomes easier to position the first sliding surface vertically in one of the recesses.

A device unit according to the invention comprises an agricultural working device, which is attached to an agricultural working machine via a coupling device and has a first and a second longitudinal side, which, facing away from one another, extend along a longitudinal direction of this agricultural working device; a trailer for the working device, wherein the trailer has a first and a second longitudinal side, which, facing away from one another, extend along a longitudinal direction of this trailer, and a position-securing arrangement, which is provided on the respective first longitudinal sides of the working device and the trailer and comprises two position-securing mechanisms according to the above-described embodiments, in any feasible combination, wherein a first position-securing mechanism of the two position-securing mechanisms is disposed in the longitudinal direction of the trailer, adjacent to a front wheel axle thereof and a second position-securing mechanism of the two position-securing mechanisms is disposed in the longitudinal direction of the trailer, adjacent to a rear wheel axle thereof.

With respect to the advantages and effects that can be achieved with the device unit, in order to avoid repetition, reference is made to the aforementioned statements regarding the position-securing mechanism, which apply similarly for the device unit.

According to an embodiment, in each of the two position-securing mechanisms, the second functional section of the receiving device has a hook-shaped indentation, which is open toward the second longitudinal side of the working device and engageable with a section of the first functional section, which is used to form the support bearing, by horizontally displacing the first longitudinal side of the working device in the direction toward the first longitudinal side of the trailer, thereby permitting the horizontal displacement of the working device to be transferred to the trailer.

Therefore, when the working device is moved horizontally onto the relatively lightweight trailer, the trailer is oriented relative to the working device so easily that the first and the second functional section of the two position-securing mechanisms are engaged into one another.

BRIEF DESCRIPTION OF THE DRAWINGS

Further features and advantages of the invention will become apparent from the description of exemplary embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
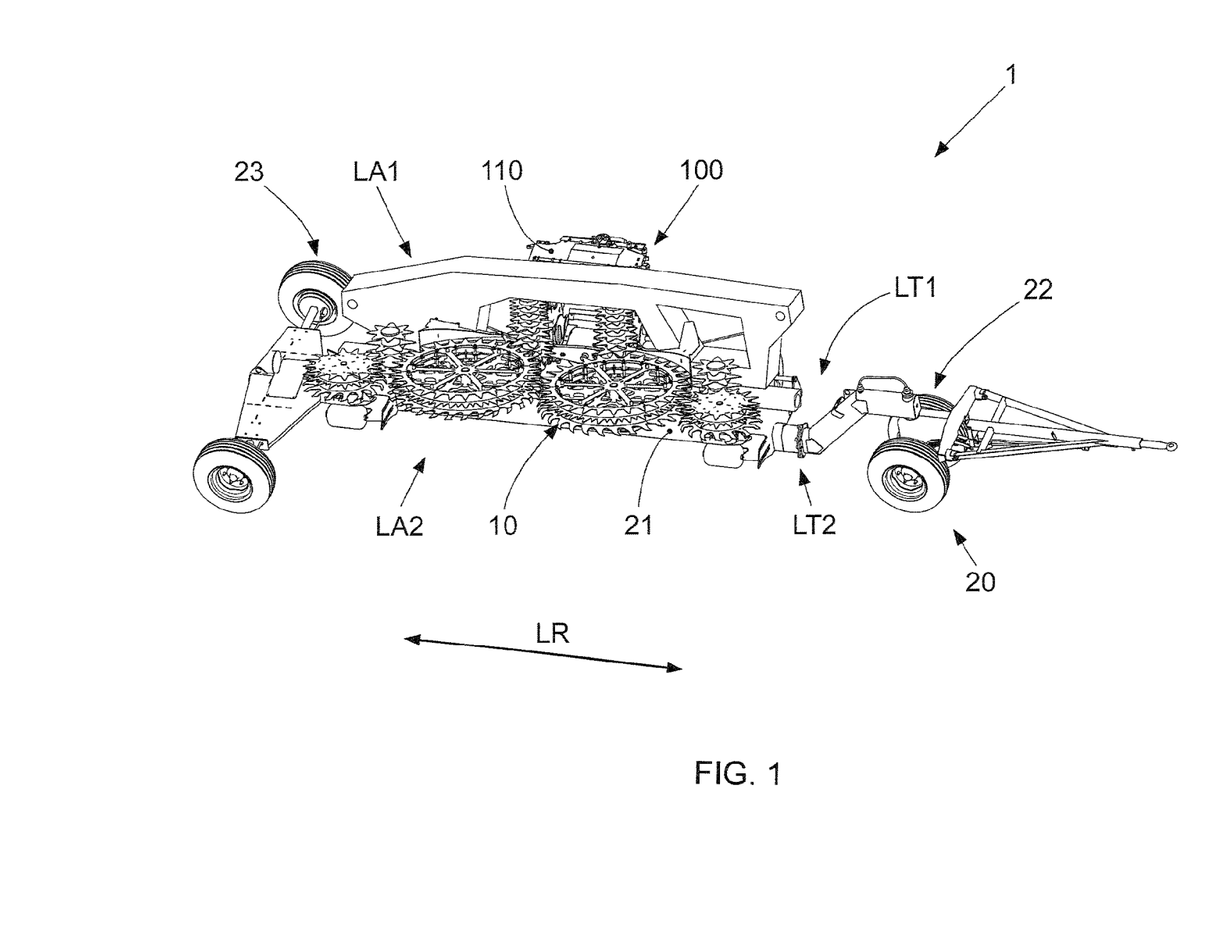
FIG. 1 presents a perspective side view of a device unit according the invention.
Figure 2:
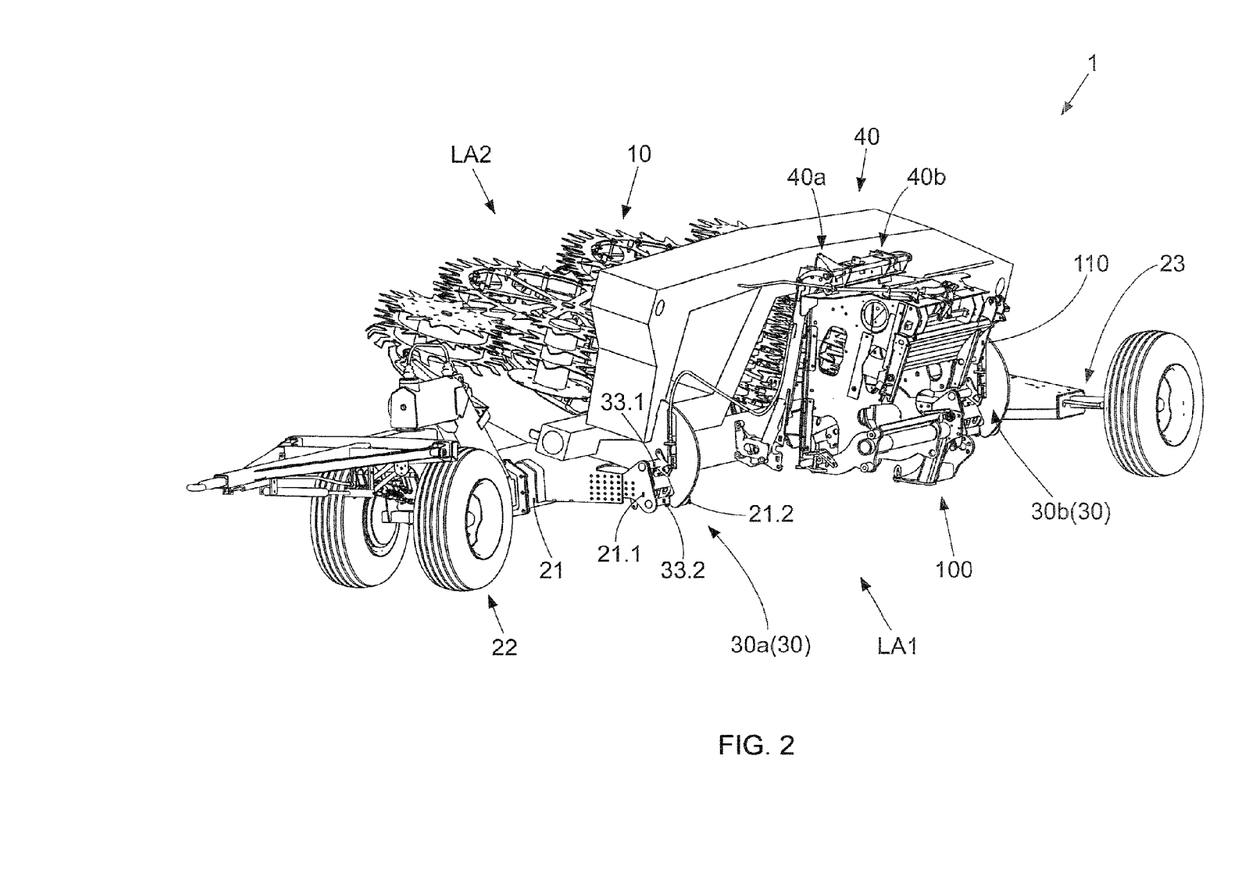
FIG. 2 presents another perspective side view of the device unit according to the invention.

As shown in FIGS. 1 and 2, a device unit 1 comprises an agricultural working device 10, a trailer 20 for the working device 10 and a position-securing arrangement 30 for securing the position of the working device 10 at or on the trailer 20.

The working device 10 is embodied as a corn header in this case. The corn header is not shown in full detail and has been folded up and can be attached, as a front harvesting attachment, to a crop feeder 110 of an incompletely depicted agricultural working machine 100 by use of a coupling device 40. The working device 10 has a first longitudinal side LA1 and a second longitudinal side LA2, which, facing away from each other, extend along a longitudinal direction LR of the working device.

The trailer 20 also has a first longitudinal side LA1 and a second longitudinal side LA2, which, facing away from each other, extend along a longitudinal direction LR of this trailer. In FIG. 1, where the working device 10 is depicted on the trailer 20, the longitudinal directions LR of the working device 10 and the trailer 10 coincide and are therefore both labelled "LR".

The trailer 20 has inertia of approximately 7 t total weight and a telescopic main frame 21. By use of the telescopic main frame 21, the length of the trailer 20 can be adapted to working devices 10 having different working widths (length in the longitudinal direction LR). In order to adjust the length, a rear wheel axle 23 of the trailer 20 is fixed in position and, with the lock released (not shown), the trailer 20 is pulled apart or pushed together in the longitudinal direction LR. When such a longitudinal adjustment of the trailer 20 is carried out, working-device receptacles 24, 25 (see FIGS. 3 and 4) provided on a front or rear part of the trailer 20 also are adjusted, in synchronism therewith.

In order to ensure sufficient anti-roll stability in light of the higher center of gravity of the folded-up working device 10 on the trailer 20, a track width of the rear wheel axle 23 of the trailer 20 is wider than a track width of a front wheel axle 22 of the trailer 20 by approximately 2.75 m. A non-illustrated compressed-air brake ensures that the trailer 20 is approved for use at a hauling speed of 50 km/h on a public road.

The position-securing arrangement 30 is provided on the first longitudinal sides LA1 and LT1 of the working device 10 and the trailer 20, respectively, and comprises a first position-securing mechanism 30a, which is disposed in the longitudinal direction LR of the trailer 20, adjacent to the front wheel axle 22 thereof, and a second position-securing mechanism 30b, which is disposed in the longitudinal direction LR of the trailer 20, adjacent to the rear wheel axle 23 thereof. The first position-securing mechanism 30a and the second position-securing mechanism 30b are substantially identical.

The coupling device 40 is provided on the first longitudinal side LA1 of the working device 10 and on a feeder housing (not shown) of the crop feeder 110, and comprises a first coupling unit 40a, which is adjacent to the first position-securing mechanism 30a, and a second coupling unit 40b, which is adjacent to the second position-securing mechanism 30b. The first coupling unit 40a and the second coupling unit 40b are also substantially identical.

Since the two position-securing mechanisms 30a, 30b are substantially identical and the two coupling units 40a, 40b are substantially identical, only the first position-securing mechanism 30a and the first coupling unit 40a will be described in greater detail in the following. For that matter, the detailed structures thereof having the letter "b" instead of "a" appended to the reference numeral should be considered to apply substantially identically to the second position-securing mechanism 30b and the second coupling unit 40b.

Figure 3:
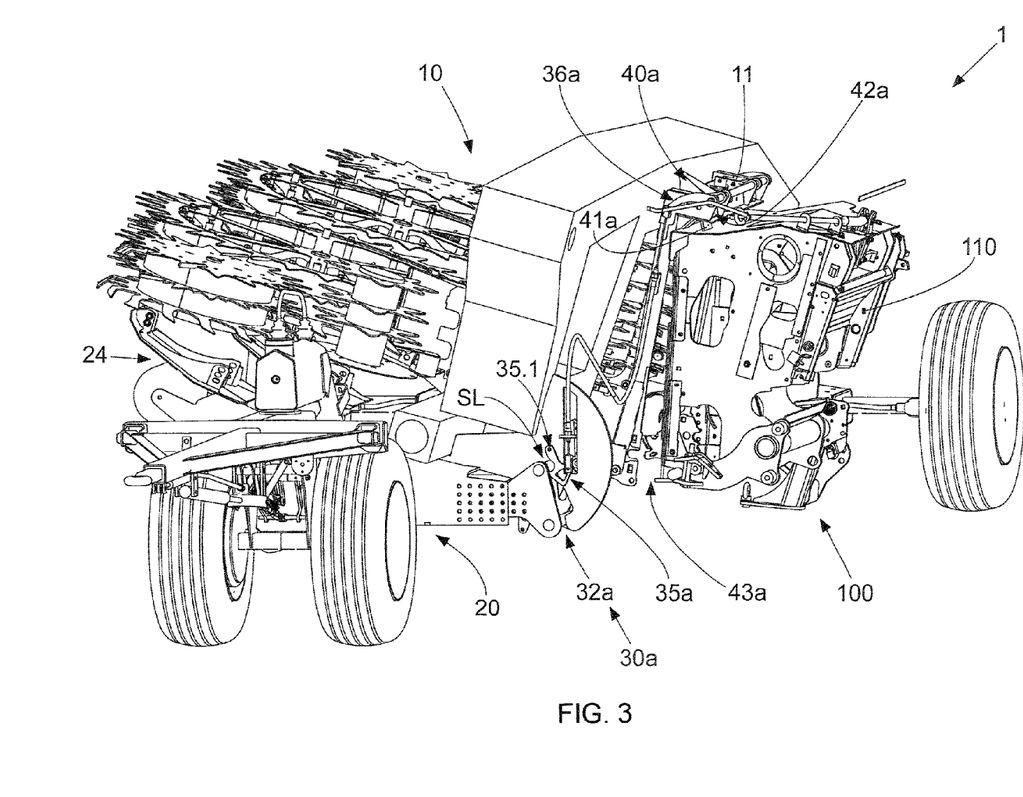
FIG. 3 presents a perspective front view of the device unit according to the invention.
Figure 4:
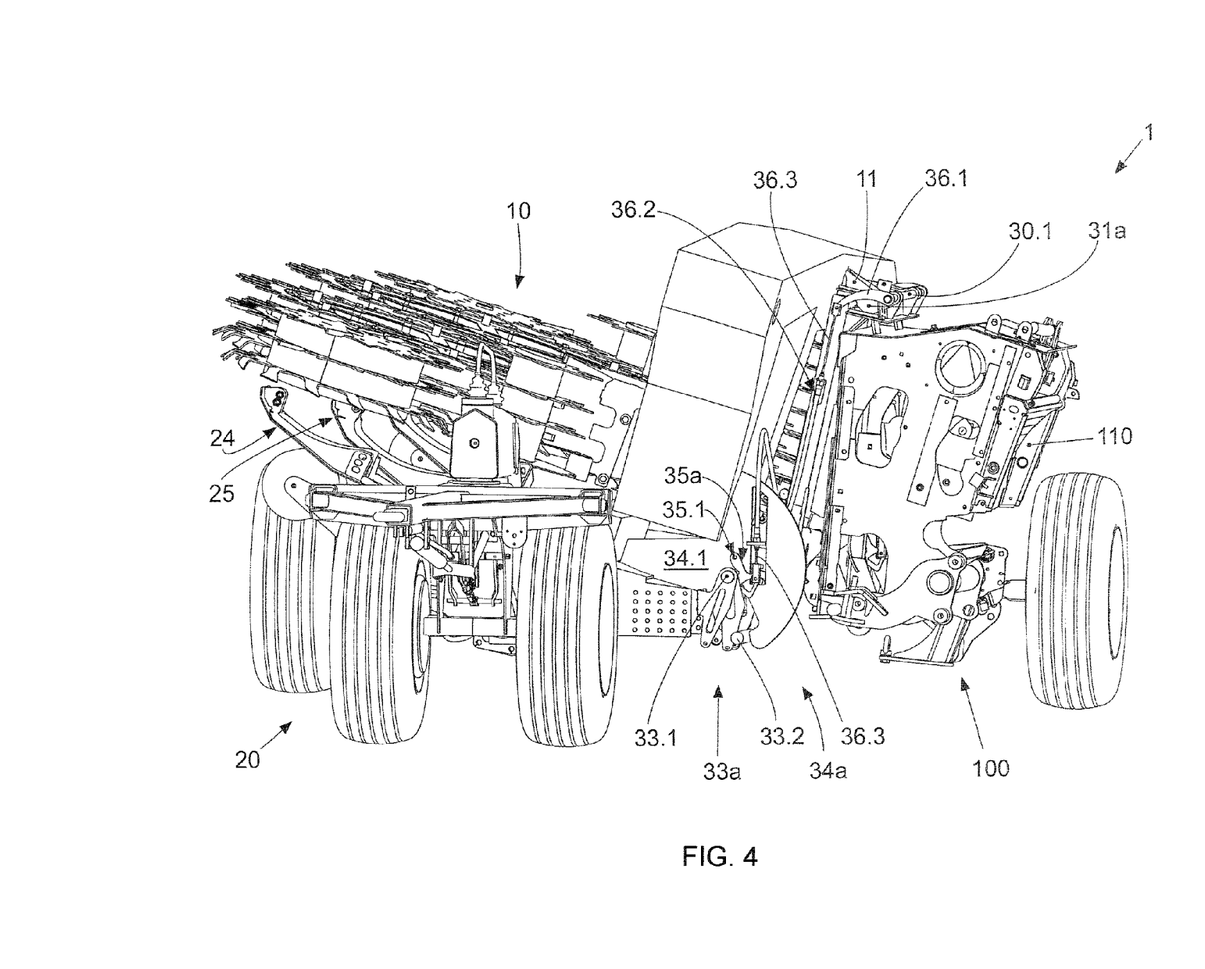
FIG. 4 presents a perspective, partially cut-away front view of the device unit according to the invention.

As shown most clearly in FIGS. 3 and 4, the first coupling unit 40a comprises a coupling hump 41a, which is provided on the top side of the feeder housing of the crop feeder 110 of the working machine 100, and a corresponding coupling receptacle 42a, which is provided on the first longitudinal side LA1 of the working device 10 and has a receiving opening (not shown) thereof pointing downward, on an upper longitudinal edge of a carrier group or a pendulum frame 11 of the working device 10.

The first coupling unit 40a furthermore comprises a lock 43a, wherein the part thereof on the working-machine side is mounted on a lower edge of a front side of the feeder housing of the crop feeder 110 of the working machine 100 and the part thereof on the working-device side is mounted on a lower longitudinal edge of the carrier group 11 of the working device 10.

In order to couple the working device 10 to the working machine 100 as a front attachment, the crop feeder 110 of the working machine 100 is lowered below the level of the coupling receptacles of the coupling units 40a, 40b and the coupling humps of the coupling units 40a, 40b are moved horizontally underneath the coupling receptacles of the coupling units 40a, 40b. Next, the crop feeder 110 of the working machine 100 is moved, e.g., hydraulically, vertically upward until the coupling humps are fully engaged in the coupling receptacles corresponding thereto and, therefore, the working device 10 can be lifted out by a further upward motion of the crop feeder 110.

Figure 5:
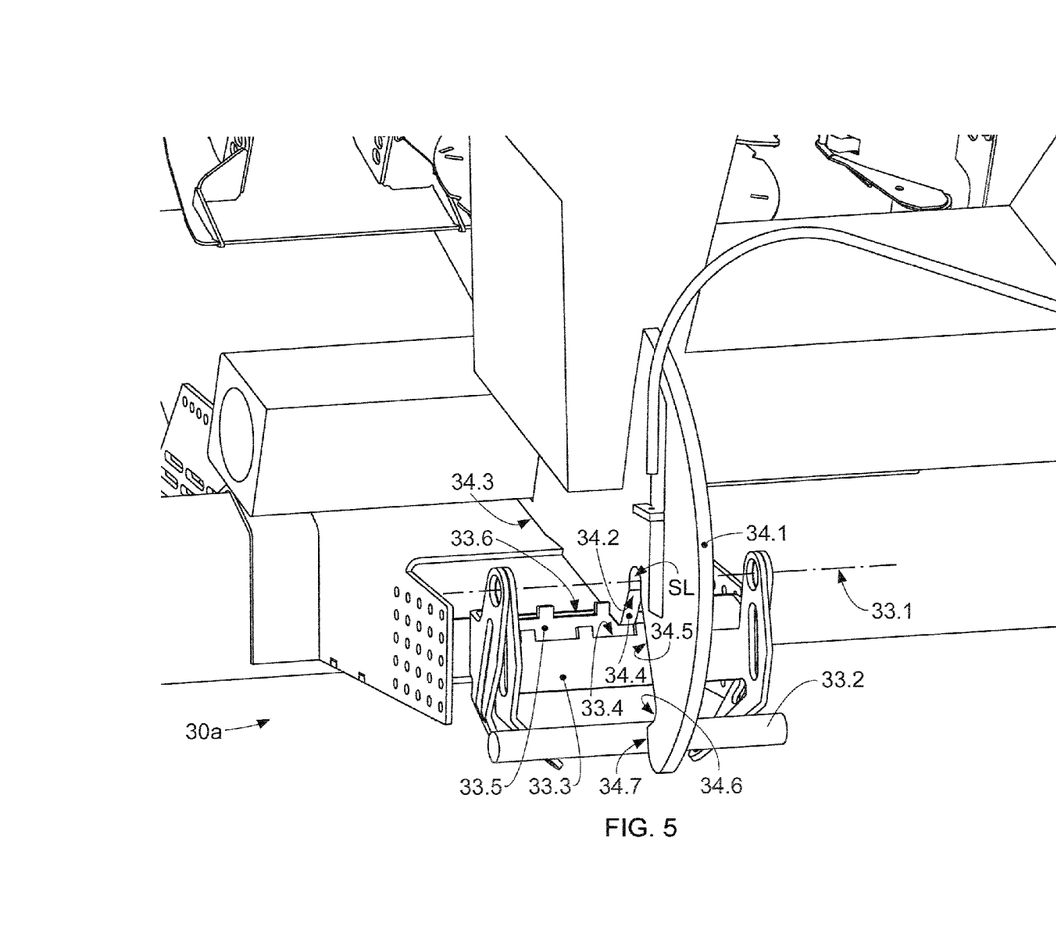
FIG. 5 presents a perspective, enlarged, partially cut-away partial view of the device unit according to the invention.

As shown in FIGS. 3-5, the first position-securing mechanism 30a comprises a sensor 31a, a receiving device 32a, a locking device 35a, and a drive device 36a. The sensor 31a is provided, on the working device 10 side, in the coupling receptacle 42a of the first coupling unit 40a of the coupling device 40 and is designed to detect a coupled state and a decoupled state of the first coupling unit 40a of the coupling device 40.

More precisely, the sensor 31a is designed as a spring-loaded, mechanical touch sensor arm, which is fastened on a shaft 30.1 of the position-securing arrangement 30. The shaft 30.1 is rotatably mounted at the upper longitudinal edge of the carrier group 11 of the working device 10, and therefore the touch sensor arm rotates the shaft 30.1 when the coupling hump 41a engages in the coupling receptacle 42a corresponding thereto and downwardly displaces or swivels the touch sensor arm against the spring preload. When the coupling hump 41a is moved out of the coupling receptacle 42a corresponding thereto, the touch sensor arm is swiveled back downwardly, due to the spring preload thereof, to an inlet of the coupling receptacle 42a.

The receiving device 32a comprises a first functional section 33a, which is provided on the first longitudinal side LT1 of the trailer 20, and a second functional section 34a, which is provided on the first longitudinal side LA1 of the working device 10. The first functional section 33a and the second functional section 34a are engageable with one another, thereby forming a support bearing SL, and therefore the first longitudinal side LA1 of the working device 10 is supported against the first longitudinal side LT1 of the trailer 20, wherein the second longitudinal side LA2 of the working device 10 faces the same direction (transversely to the longitudinal direction LR) as the second longitudinal side LT2 of the trailer 20.

The locking device 35a is disposed on the working device 10 and are selectively brought into a locked state (as shown in FIGS. 1-5), in which this locking device prevents the release of the engagement of the two functional sections 33a, 34a of the receiving device 32a, and into an unlocked state, in which this locking device permits the release of the engagement of the two functional sections 33a, 34a of the receiving device 32a.

The drive device 36a is disposed on the working device 10 and is connected to the sensor 31a in order to be controlled thereby. The drive device 36a is connected to the locking device 35a, in order to drive this locking device, and therefore the locking device is brought into the locked state when the sensor 31a detects the decoupled state of the first coupling unit 40a of the coupling device 40, and is brought into the unlocked state when the sensor 31a detects the coupled state of the first coupling unit 40a of the coupling device 40.

More precisely, the first functional section 33a of the receiving device 32a comprises a first support brace 33.1 and a second support brace 33.2, each of which extends, via a predetermined length, horizontally lengthwise and in the longitudinal direction LR of the trailer 20, between two retaining plates 21.1, 21.2 of the main frame 21 and are attached thereto. The support braces are each designed as a round bar in this case, as shown in FIG. 2.

The first functional section 33a also comprises a first notched strip 33.3 and a second notched strip 33.5 (see FIG. 5 5), each of which extends horizontally lengthwise and in the longitudinal direction LR of the trailer 20, and each of which has, on a vertically upper longitudinal edge thereof, a plurality of recesses 33.4 and 33.6, respectively. The recesses 33.4 and 33.6 have a predetermined longitudinal extension and are equidistantly spaced apart. The recesses 33.4 of the first notched strip 33.3 are offset in the longitudinal direction LR relative to the recesses 33.6 of the second notched strip, for example, by approximately half of the longitudinal extension. The first and the second notched strip 33.3, 33.5 are each swivellably mounted on the first support brace 33.1 and, therefore, are vertically displaceable, and are each spring-loaded vertically upward by means of non-illustrated springs.

As shown in FIGS. 4 and 5, the second functional section 34a of the receiving device 32a comprises a stable carrier plate 34.1, which is mounted in a positionally fixed manner on the carrier group 11 of the working device 10. The carrier plate 34.1 has a recess 34.2 with an angled contour or an angular shape, a first sliding surface 34.3, a second sliding surface 34.4 (which directly adjoins the first sliding surface 34.3 and is formed by a leg of the angular contour of the recess 34.2 extending away from the working device 10 in an opening manner), a third sliding surface 34.5 formed by a leg of the angular contour of the recess 34.2 extending toward the working device 10 in an opening manner, a hook-shaped indentation 34.6 (which directly adjoins the third sliding surface 34.5) and an end section 34.7, which directly adjoins the indentation 34.6.

The recess 34.2 of the carrier plate 34.1 is open vertically downward and has a contour which is complementary to the first support brace 33.1 and is disposed in the angle vertex of the recess 34.2, adjacent to the second and the third sliding surface 34.4, 34.5.

The recess 34.2 of the carrier plate 34.1 is configured such that, by reaching over and straddling the first support brace 33.1, this support brace can be engaged in the recess 34.2, thereby forming the support bearing SL, and therefore the first longitudinal side LA1 of the working device 10 is supported against the first longitudinal side LT1 of the trailer 20.

The end section 34.7 of the carrier plate 34.1 is disposed such that this end section bears against an outer circumference of the second support brace 33.2 when the support bearing SL is formed, wherein the second support brace 33.2 and the end section 34.7 are offset outwardly relative to the support bearing SL by a predetermined extent transversely to the longitudinal direction LR of the trailer 20 and vertically downwardly by a predetermined extent, thereby providing a counter-bearing relative to the support bearing SL.

The first sliding surface 34.3 faces vertically downward, extends horizontally lengthwise and transversely to the longitudinal direction LR of the working device 10 or the trailer 20 and is offset outwardly relative to the support bearing SL by a predetermined extent transversely to the longitudinal direction LR of the working device 10, or is offset inwardly toward the trailer 20, transversely to the longitudinal direction LR of the trailer 20.

The second sliding surface 34.4 extends directly adjacent to a longitudinal end of the first sliding surface 34.3, which is located inward transversely to the longitudinal direction LR of the working device 10 or outward transversely to the longitudinal direction LR of the trailer 20, thereby providing a sliding connection between the first sliding surface 34.4 and the support bearing SL or the angle vertex of the angled contour of the recess 34.2. The first sliding surface 34.3 is offset vertically downward by a predetermined extent relative to the support bearing SL or the angle vertex of the angular contour of the recess 34.2.

The first and the second notched strip 33.3, 33.5 are disposed such that, upon mutual engagement of the first and the second functional sections 33a, 34a, i.e., upon engagement of the first support brace 33.1 in the angle vertex of the angular contour of the recess 34.2, thereby forming the support bearing SL, the first sliding surface 34.3 is engaged in one of the recesses 33.4, 33.6 of one of the two notched strips 33.3, 33.5 and rests on a base section of the particular recess 33.4, 33.6, as shown in FIG. 5.

The hook-shaped indentation 34.6 is open toward the second longitudinal side LA2 of the working device 10 and is engageable with the first support brace 33.1 of the first functional section 33a, which is used to form the support bearing SL, by horizontally displacing the first longitudinal side LA1 of the working device 10 in the direction toward the first longitudinal side LT1 of the trailer 20, thereby permitting the horizontal displacement of the working device 10 to be transferred to the trailer 20.

As is evident from FIGS. 3 and 4, the locking device 35a is formed by a claw, which is swivellably hinge-mounted via a swivel bearing 35.1 on the carrier plate 34.1 of the second functional section 34a of the receiving device 32a and, in the locked state (as shown in FIGS. 1-5), reaches around the first support brace 33.1 of the first functional section 33a of the receiving device 32a from below by a hooked section and, in the unlocked state, is swivelled away upwardly, and therefore the hook-shaped section is disengaged from the first support brace 33.1. The locking device 35a is spring-loaded in the direction of the locked state thereof by a non-illustrated spring and thereby supports the spring of the sensor 31a.

As is also evident from FIGS. 3 and 4, the drive device 36a comprises a lever 36.1, which is fastened on the shaft 30.1 of the position-securing arrangement 30 and is therefore mechanically connected to the sensor 31a and is swivelled in synchronism with a swivelling of the sensor 31a (touch sensor arm), and this drive device comprises a Bowden cable arrangement 36.2. The Bowden cable 36.3 is mechanically connected to the locking device 35a formed by the claw and to the lever 36.1 of the drive device 36a, thereby permitting a swivel motion of the lever 36.1 to be transferred directly to the locking device 35a.

In order to place the working device 10, which is attached to the working machine, on the trailer 20, the working device 10 is moved from the first longitudinal side LT1 of the trailer 20 horizontally toward this trailer.

When the working device 10 is placed on the trailer 20, the indentations in the carrier plates of the two position-securing mechanisms 30a, 30b permit this working device to be moved toward the stop. That is, if this movement toward the stop does not result in placement exactly at a right angle in front of the trailer 20, this trailer can be oriented by being pushed back slightly, with the indentations in the carrier plates engaged with the respectively corresponding first support brace. The indentations permit an approximately horizontal transfer of force to the lightweight trailer 20, whereby this trailer can only oppose very slight frictional forces at the wheels.

Finally, by lowering the crop feeder 110 and, therefore, the working device 10, the first support braces of the two position-securing mechanisms 30a, 30b can slide along the third sliding surfaces of the carrier plates of the two position-securing mechanisms 30a, 30b and into the angle vertex of the recesses of the carrier plates of the two position-securing mechanisms 30a, 30b, thereby forming the two support bearings SL.

As an alternative, when the working device 10 is placed on the trailer 20, the first sliding surfaces of the carrier plates of the two position-securing mechanisms 30a, 30b are placed onto the first support braces of the two position-securing mechanisms 30a, 30b. Hence, when the working device 10 is moved horizontally toward the trailer 20, the first support braces slide along the first sliding surfaces and, subsequently, along the second sliding surfaces of the carrier plates of the two position-securing mechanisms 30a, 30b into the angle vertex of the recesses of the carrier plates of the two position-securing mechanisms 30a, 30b, thereby forming the two support bearings SL.

Since the first and the second support braces of the two position-securing mechanisms 30a, 30b extend via a predetermined, preferably identical length horizontally and in the longitudinal direction LR of the trailer 20, the receiving pair of the working device 10 and the trailer 20 has, in this direction, a pair tolerance (e.g. approximately 30 cm) that approximately corresponds to the predetermined length, which makes it easier to place the working device 10 on the trailer 20 in a positionally secure manner.

The support bearing SL provides the radial support for the working device 10. The support in the direction of travel of the trailer 20 is ensured by means of the engagement of the first sliding surfaces of the carrier plates of the two position-securing mechanisms 30a, 30b in the respective recess of the notched strips of the two position-securing mechanisms 30a, 30b.

When the support bearing SL is formed and the crop feeder 110 is lowered further and the locking devices of the two coupling units 40a, 40b of the coupling device 40 are unlocked, the coupling humps of the two coupling units 40a, 40b of the coupling device 40 slide out of the respective coupling receptacles thereof. Consequently, the sensors (touch sensor arms) of the two position-securing mechanisms 30a, 30b swivel downward and, as a result, the levers of the drive devices of the two position-securing mechanisms 30a, 30b also swivel downward and, therefore, the locking devices of the two position-securing mechanisms 30a, 30b are brought into the locked state thereof.

The working device is removed from the trailer 20 in the reverse manner, wherein moving the crop feeder 110 upward causes the coupling humps of the two coupling units 40a, 40b of the coupling device 40 to engage in the respective coupling receptacle thereof, whereby the sensors (touch sensor arms) of the two position-securing mechanisms 30a, 30b swivel upward and, as a result, the levers of the drive devices of the two position-securing mechanisms 30a, 30b swivel upward and, therefore, the locking devices of the two position-securing mechanisms 30a, 30b are brought into the unlocked state thereof.

The above-described automated function makes the transfer of the working device 10 very safe, since this working device is always secured either to the working machine 100 or to the trailer 20.

In summary, the invention provides a position-securing mechanism for securing the position of an agricultural working device, which can be attached to an agricultural working machine via a coupling device, on a trailer, and a device unit of an agricultural working device and a trailer for the working device, wherein the device unit is equipped with two such position-securing mechanisms, thereby ensuring that the working device can be quickly and reliably removed from the trailer and placed onto and positionally secured on the trailer.

LIST OF REFERENCE CHARACTERS 1 device unit
10 working device
11 carrier group
20 trailer
21 main frame
21.1 retaining plate
21.2 retaining plate
22 front wheel axle
23 rear wheel axle
24 working-device receptacle
25 working-device receptacle
30 position-securing arrangement
30a first position-securing mechanism
30b second position-securing mechanism
30.1 shaft
31a sensor
32a receiving device
33a first functional section
33.1 first support brace
33.2 second support brace
33.3 first notched strip
33.4 recess
33.5 second notched strip
33.6 recess
34a second functional section
34.1 carrier plate
34.2 recess
34.3 first sliding surface
34.4 second sliding surface
34.5 third sliding surface
34.6 indentation
34.7 end section
35a locking device
35.1 swivel bearing
38a drive device
36.1 lever
36.2 Bowden cable arrangement
36.3 Bowden cable
40 coupling device
40a first coupling unit
40b second coupling unit
41a coupling hump
42a coupling receptacle
43a lock
100 working machine
110 crop feeder
SL support bearing
LA1 first longitudinal side
LA2 second longitudinal side
LT1 first longitudinal side
LT2 second longitudinal side
LR longitudinal direction As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A position-securing mechanism for securing a position of an agricultural working device on a trailer, where the working device attachable to an agricultural working machine via a coupling device, the position-securing mechanism comprising:
   a sensor provided on the coupling device, on the working device side, designed to detect a coupled state and a decoupled state of the coupling device;
   a receiving device having a first functional section, which is provided on a first longitudinal side (LT1) of two longitudinal sides (LT1, LT2) of the trailer, which face away from one another and extend along a longitudinal direction (LR) of this trailer, and a second functional section, which is provided on a first longitudinal side (LA1) of two longitudinal sides (LA1, LA2) of the working device, which face away from one another and extend along a longitudinal direction (LR) of this working device;
   wherein the first and the second functional sections are engaged with one another to forming a support bearing (SL), and therefore the first longitudinal side (LA1) of the working device is supported on the first longitudinal side (LT1) of the trailer and wherein the second longitudinal side (LA2) of the working device faces the same direction as the second longitudinal side (LT2) of the trailer;
   a locking device disposed on the working device and selectively brought into a locked state in which this locking device prevents the release of the engagement of the two functional sections of the receiving device and into an unlocked state in which this locking device permits the release of the engagement of the two functional sections of the receiving device; and
   a drive device disposed on the working device and is connected to the sensor in order to be controlled thereby, and is connected to the locking device in order to drive this locking device, wherein the locking device is brought into the locked state when the sensor detects the decoupled state and is brought into the unlocked state when the sensor detects the coupled state.

2. The position-securing mechanism according to claim 1, wherein the first functional section of the receiving device comprises a first support brace that extends horizontally lengthwise and in the longitudinal direction (LR) of the trailer and wherein the second functional section of the receiving device has a recess that is open vertically downward and configured such that, by reaching over and straddling the first support brace, the support brace is engageable in the recess thereby forming the support bearing (SL), and therefore the first longitudinal side (LA1) of the working device is supported against the first longitudinal side (LT1) of the trailer.

3. The position-securing mechanism according to claim 1, wherein the first functional section of the receiving device comprises a second support brace that extends horizontally lengthwise and in the longitudinal direction (LR) of the trailer, wherein the second functional section of the receiving device has an end section that is disposed such that the end section bears against an outer circumference of the second support brace when the support bearing (SL) is formed and wherein the second support brace and the end section are offset outwardly relative to the support bearing (SL) by a predetermined extent transversely to the longitudinal direction (LR) of the trailer and vertically downward by a predetermined extent.

4. The position-securing mechanism according to claim 1, wherein the second functional section of the receiving device has a first sliding surface that faces vertically downward and extends horizontally lengthwise and transversely to the longitudinal direction (LR) of the working device and is offset by a predetermined extent outwardly relative to the support bearing (SL) transversely to the longitudinal direction (LR) of the working device.

5. The position-securing mechanism according to claim 4, wherein the second functional section of the receiving device has a second sliding surface that extends directly adjacent to an inner longitudinal end of the first sliding surface that extends transversely to the longitudinal direction (LR) of the working device, and therefore the second sliding surface provides a sliding connection between the first sliding surface and the support bearing (SL), and wherein the first sliding surface is offset vertically downward by a predetermined extent relative to the support bearing (SL).

6. The position-securing mechanism according to claim 4, wherein the first functional section comprises a notched strip that extends horizontally lengthwise and in the longitudinal direction (LR) of the trailer and has, on a vertically upper longitudinal edge thereof, a plurality of recesses that are equidistantly spaced apart from one another in the longitudinal direction (LR) and wherein the notched strip is disposed such that upon mutual engagement of the first and the second functional section, the first sliding surface is engaged in one of the recesses and rests on a base section thereof.

7. The position-securing mechanism according to claim 6, wherein the notched strip is vertically displaceable and is spring-loaded vertically upward.

8. The position-securing mechanism according to claim 4, wherein the first functional section comprises a first and a second notched strip, each of which extends horizontally lengthwise and in the longitudinal direction (LR) of the trailer and each of which has, on a vertically upper longitudinal edge thereof, a plurality of recesses that have a predetermined longitudinal extension and are equidistantly spaced apart, wherein the recesses of the first notched strip are offset in the longitudinal direction (LR), relative to the recesses of the second notched strip, by approximately half of the longitudinal extension and wherein the first and the second notched strip are each vertically displaceable and are spring-loaded vertically upward and are disposed such that, upon mutual engagement of the first and the second functional section, the first sliding surface is engaged in one of the recesses of one of these two notched strips and rests on a base section of the particular recess.

9. A device unit, comprising:
   an agricultural working device that is attachable to an agricultural working machine via a coupling device and has a first and a second longitudinal side (LA1, LA2) that face away from each other and extend along a longitudinal direction (LR) of the working device;
   a trailer for the working device having a first and a second longitudinal side (LT1, LT2) that face away from one another and extend along a longitudinal direction (LR) of this trailer; and
   a position-securing arrangement provided on the respective first longitudinal sides (LA1, LT1) of the working device and the trailer that comprises two position-securing mechanisms as set forth in claim 1,
   wherein a first position-securing mechanism of the two position-securing mechanisms is disposed in the longitudinal direction (LR) of the trailer, adjacent to a front wheel axle thereof and a second position-securing mechanism of the two position-securing mechanisms is disposed in the longitudinal direction (LR) of the trailer adjacent to a rear wheel axle thereof.

10. The device unit according to claim 9, wherein, in each of the two position-securing mechanisms, the second functional section of the receiving device has a hook-shaped indentation that is open toward the second longitudinal side (LA2) of the working device and is engageable with a section of the first functional section that is used to form the support bearing (SL), by horizontally displacing the first longitudinal side (LA1) of the working device in the direction toward the first longitudinal side (LT1) of the trailer, thereby permitting the horizontal displacement of the working device to be transferred to the trailer.

* * * * *